US011256871B2

(12) United States Patent
Jeffs et al.

(10) Patent No.: US 11,256,871 B2
(45) Date of Patent: Feb. 22, 2022

(54) AUTOMATIC DISCOVERY OF BUSINESS-SPECIFIC TERMINOLOGY

(71) Applicant: Verint Americas Inc., Alpharetta, GA (US)

(72) Inventors: Christopher J. Jeffs, Roswell, GA (US); Ian Beaver, Spokane, WA (US)

(73) Assignee: VERINT AMERICAS INC., Alpharetta, GA (US)

(*) Notice: Subject to any disclaimer, the term of this patent is extended or adjusted under 35 U.S.C. 154(b) by 210 days.

(21) Appl. No.: 16/655,394

(22) Filed: Oct. 17, 2019

(65) Prior Publication Data

US 2020/0125800 A1    Apr. 23, 2020

Related U.S. Application Data

(60) Provisional application No. 62/746,659, filed on Oct. 17, 2018.

(51) Int. Cl.
*G06F 40/247* (2020.01)
*G06F 40/279* (2020.01)
*G06F 40/30* (2020.01)

(52) U.S. Cl.
CPC ............ *G06F 40/30* (2020.01); *G06F 40/279* (2020.01)

(58) Field of Classification Search
CPC .... G06F 40/237; G06F 40/242; G06F 40/247; G06F 40/279; G06F 40/284; G06F 40/295; G06F 40/30; G10L 15/1822; G10L 15/183
USPC .................. 704/9, 10, 240, 255, 1
See application file for complete search history.

(56) References Cited

U.S. PATENT DOCUMENTS

| | | | | |
|---|---|---|---|---|
| 5,181,163 | A * | 1/1993 | Nakajima | G06F 40/247 704/10 |
| 8,301,450 | B2 * | 10/2012 | Lee | G10L 15/1822 704/9 |
| 10,467,536 | B1 * | 11/2019 | Lai | G06N 20/00 |
| 2003/0233232 | A1 | 12/2003 | Fosler-Lussier et al. | |
| 2008/0162109 | A1 * | 7/2008 | Strassner | G06F 40/247 704/1 |
| 2010/0146006 | A1 | 6/2010 | Dasgupta et al. | |
| 2013/0018650 | A1 * | 1/2013 | Moore | G06F 40/44 704/9 |
| 2014/0249799 | A1 * | 9/2014 | Yih | G06F 40/247 704/9 |
| 2015/0073791 | A1 * | 3/2015 | Gorin | G10L 15/183 704/239 |
| 2015/0127652 | A1 | 5/2015 | Romano | |
| 2015/0278192 | A1 * | 10/2015 | Bretter | G06F 40/30 704/9 |

(Continued)

OTHER PUBLICATIONS

Search Report, dated Mar. 2, 2020, received in connection with EP Patent Application No. 19203707.5.

(Continued)

*Primary Examiner* — Martin Lerner
(74) *Attorney, Agent, or Firm* — Meunier Carlin & Curfman LLC

(57) ABSTRACT

A method and computer product encoding the method is available for preparing a domain or subdomain specific glossary. The method included using probabilities, word context, common terminology and different terminology to identify domain and subdomain specific language and a related glossary updated according to the method.

20 Claims, 2 Drawing Sheets

(56) References Cited

U.S. PATENT DOCUMENTS

| | | | | |
|---|---|---|---|---|
| 2018/0052849 A1* | 2/2018 | Jagmohan | ............... | G06F 40/30 |
| 2018/0197531 A1* | 7/2018 | Baughman | ............ | G06F 40/247 |
| 2020/0035230 A1* | 1/2020 | Yadav | ................... | G06F 40/247 |
| 2020/0125798 A1* | 4/2020 | Beaver | .................... | G06F 40/30 |
| 2020/0311346 A1* | 10/2020 | Beaver | ................. | G06F 40/295 |
| 2020/0372115 A1* | 11/2020 | Liu | ......................... | G06F 40/58 |

OTHER PUBLICATIONS

Federico, M., et al., "IRSTLM: an Open Source Toolkit for Handling Large Scale Language Models," Ninth Annual Conference of the International Speech Communication Association, 2008, pp. 1618-1621.

Mikolov, T., et al., "Efficient Estimation of Word Representations in Vector Space," Proceedings of the International Conference on Learning Representations (ICLR), arXiv:1301.3781v3, 2013, 12 pages.

Ramos, J., "Using TF-IDF to Determine Word Relevance in Document Queries," Proceedings of the First Instructional Conference on Machine Learning, 2003, 4 pages.

Rosenfeld, R. "The CMU Statistical Language Modeling Toolkit and its use in the 1994 ARPA CSR Evaluation," Proceedings of the Spoken Language Systems Technology Workshop, 1995, pp. 47-50.

Stolcke, A., "SRILM—An Extensible Language Modeling Toolkit," Seventh International Conference on Spoken Language Processing, 2002, 4 pages.

\* cited by examiner

AUTOMATIC DISCOVERY OF BUSINESS-SPECIFIC TERMINOLOGY

CROSS REFERENCE TO RELATED APPLICATIONS

This application is a non-provisional patent application claiming priority to Provisional Patent Application Ser. No. 62/746,659, filed Oct. 17, 2018 which is hereby incorporated by this reference in its entirety as if fully set forth herein.

BACKGROUND

Field

Embodiments of the present invention relate to deriving business-specific language from collected conversations.

Background

In speech recognition, a language model (LM) is a graph of probabilities associated to word transitions from a known vocabulary, such as a word lattice. Word embedding is the collective name for a set of language modeling and feature learning techniques in natural language processing (NLP) where words or phrases from the vocabulary are mapped to vectors of real numbers. Some approaches to language model development include term frequency inverse document frequency (TF-IDF) and word similarity. Both language model and word embedding probabilities are calculated from a collection of texts that originate from a specific language domain that may differ greatly from other language domains. For instance, vocabulary in the insurance domain is expected to differ greatly from vocabulary in the telecommunications domain.

BRIEF SUMMARY OF THE DISCLOSURE

Accordingly, the present invention is directed to automatic discovery of business-specific terminology that obviates one or more of the problems due to limitations and disadvantages of the related art.

Further embodiments, features, and advantages of the automatic discovery of business-specific terminology, as well as the structure and operation of the various embodiments of the automatic discovery of business-specific terminology, are described in detail below with reference to the accompanying drawings.

A computer product according to principles described herein includes computer executable code embodied in a non-transitory computer readable medium that, when executing on one or more computing devices performs a method of automatically extracting subdomain specific terminology and phrases within a language model for a language domain. The method performed by execution of the computer executable code includes identifying terminology that is the same for all subdomains in the domain to define a common terminology; subtracting the common terminology from the language model to identify subdomain-specific terminology for each subdomain; calculating a priori appearance probability of a series of words using the subdomain terminology for each subdomain; and automatically determining similarity of meanings of terms across subdomains by identifying terms with the similar appearance probability within a series of words.

A method according to principles described herein for automatically extracting subdomain specific terminology and phrases within a language model for a language domain, includes identifying terminology that is the same for all subdomains in the domain to define a common terminology; subtracting the common terminology from the language model to identify subdomain specific terminology for each subdomain; calculating a priori appearance probability of a series of words using the subdomain terminology for each subdomain; and automatically determining similarity of meanings of terms across subdomains by identifying terms with the similar appearance probability within a series of words.

It is to be understood that both the foregoing general description and the following detailed description are exemplary and explanatory only, and are not restrictive of the invention as claimed.

BRIEF DESCRIPTION OF THE DRAWINGS

The accompanying figures, which are incorporated herein and form part of the specification, illustrate automatic discovery of business-specific terminology. Together with the description, the figures further serve to explain the principles of the automatic discovery of business-specific terminology described herein and thereby enable a person skilled in the pertinent art to perform and use automatic discovery of business-specific terminology.

DETAILED DESCRIPTION

Reference will now be made in detail to embodiments of the automatic discovery of business-specific terminology with reference to the accompanying figures. The same reference numbers in different drawings may identify the same or similar elements.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Figure 1:
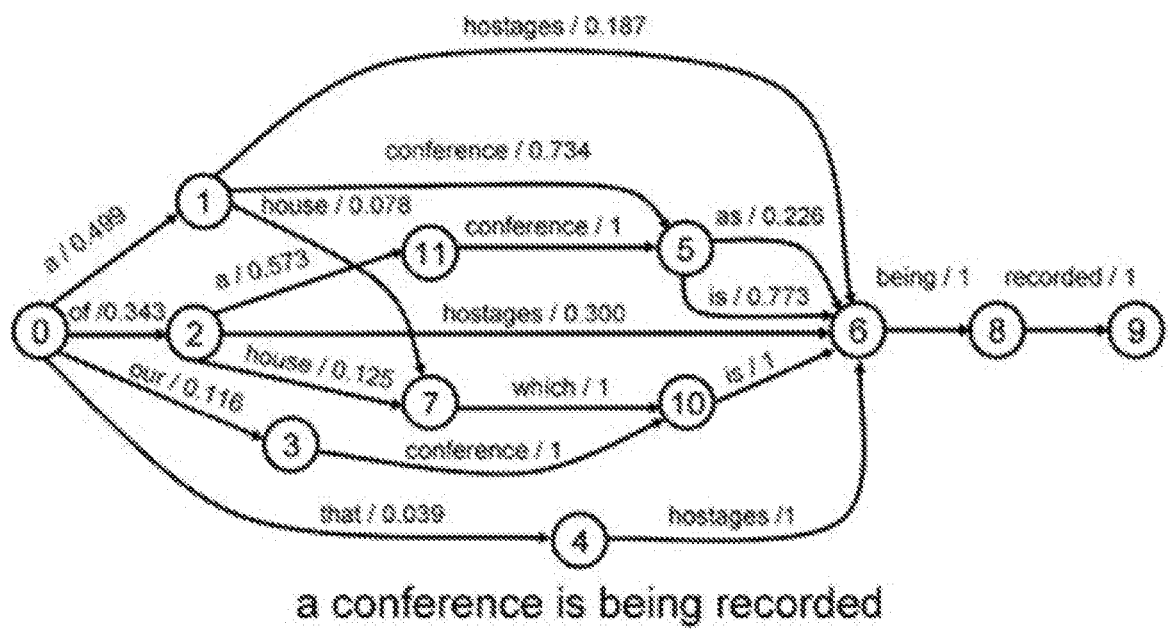
FIG. 1 is an example of a word lattice.

To create a language model (LM) for use in a specific domain, texts are gathered from various sources such as websites, chat logs, call logs, documentation, and other sources in that domain. Once the texts are aggregated, LM construction toolkits such as the CMU [1], SRI[2], or IRST [3] are applied to the data. They extract the vocabulary used within the texts and the statistics of their use with other vocabulary, such as unigrams, bigrams, and trigrams. These statistics can then be used to calculate a priori statistics of sentences that can be formed using the known vocabulary, which are organized in a lattice. A word lattice is an acyclic directed graph with a single starting node and edges labeled with a word and its corresponding probability of following the current word in the source texts. An example word lattice is shown in FIG. 1. By following a path through the lattice from the starting point to any particular node, the a priori probability of that series of words (i.e. a sentence) appearing in the domain specific texts can be calculated. In the case of FIG. 1, the subject phrase is "a conference is being recorded." A different approach to modeling word usage in context is to construct vectors to represent each word in a N-dimensional vector space. These vectors are manipulated during training based on observing where terms occur in the context of the surrounding terms. Terms that occur in the same context are moved closer to alignment. Terms that do not occur in the same context are moved further away. Once trained, the set of vectors can be used to reason about the similarity of words by performing vector arithmetic, such as measuring the distance between two points in the vector space. This approach is known as word embeddings [4], and is a way to group similar terms in a corpus together. Both the LM and word embedding approaches are unsupervised in that they require no human effort to construct. The training algorithms are simply given large training corpora and they use term positions and statistics within the corpora to build a model.

In closely related or similar domains, different language may have common meanings that can be determined and added to a glossary according to principles described herein. By creating LMs or word embedding vectors/models for multiple businesses within a similar domain, these vocabulary probabilities can be compared to determine terms that are important to specific businesses, while filtering out terms common to the domain. In contrast to other common information retrieval methods such as term frequency inverse document frequency (TF-IDF) [4], the probabilities can capture phrasal information or context through the word lattice. For example, it may be that the phrase "contact customer care department" occurs with high probability in company A data, whereas in company B, the phrase "contact customer service department" occurs with high probability. By comparing these two phrases constructed from the word lattice it can be automatically determined that "customer care" is a company A specific word with an equivalent in company B of "customer service". By using this method, company specific terminology and their equivalents in other companies within the same domain can be automatically discovered.

In contrast to other word similarity approaches such as word embeddings [5], the word lattice can show not just that two terms have similar usage between companies, such as the above example, but also how important each term is to their respective company based on probability of usage. This importance can be used for ranking along with identifying the company specific terminology.

Once LMs are created for existing domains (e.g., by company, industry, commercial sector or the like), they can be used for various applications. Domains as used herein is not limited to any specific meaning, except that a "domain" has theme connecting the language. For example, a domain is a collection of language where it would be reasonable to expect similar vocabulary to be used across all included sources. One such application would be to surface industry or domain specific terminology. In this case we would look at what terminology is the same between LMs of different companies within a domain, and then subtract terminology that is the same with LMs from other domains. For example, if we wanted to isolate travel specific terminology, we could find the vocabulary that has higher probabilities within all of the companies in the travel domain, and then subtract any overlapping vocabulary that also has higher probabilities in unrelated domains such as insurance. This would leave terms such as baggage, airport locations, and weather events; and remove general terms like policies, belongings, and dates.

Differencing LMs as demonstrated by example herein can also be used to populate customer service knowledge articles and glossaries automatically. When a new company is added to a customer service account, the method may be applied to generate a glossary of company specific terminology that the customer service representatives must become familiar with. A company specific term may be added to a knowledge and examples using that term by taking all high probability paths (sentences) from the word lattice.

To begin, a domain of language is first identified. A language domain is that in which general vocabulary and topics are expected to have similar meaning among all members of the domain. Domains can be hierarchical to encompass general terminology relevant to all child domains, but the child domains may have significant subsets of language not found in sibling domains.

For example, within the top level domain of travel, there may be sub-domains of airline travel, train travel and ocean travel. Everything under the domain of travel will include topics such as departure and arrival dates, luggage, itineraries, weather, and locations. But within the sub-domain of ocean travel there will be terminology specific to ocean weather, ships, nautical miles, and ports. These terms would not be expected in airline travel, but you would expect terms related to airports, aircraft, and flying that would not be found in ocean travel. Once a domain is chosen, the individual companies that operate within that domain would be separated into datasets. To create each company dataset, texts from various sources within that company would be aggregated. Sources can include FAQs, websites, databases, knowledge bases, web chat and voice transcription logs, customer service e-mails, and similar. For example, public forums and social media are a useful source outside of the company controlled sources you listed. Text would be extracted from all such sources and stored in a format prepared for a LM construction toolkit.

Once the text was aggregated, a LM construction tool is applied to build the vocabulary and word lattice. This is repeated for each dataset within a domain or sub-domain of language. Once all company LMs are created for a domain and any sub-domains, they can be compared to extract company specific terminology.

By taking the difference between two LMs of companies in the same domain, we can extract all high probability terms that do not appear in the other LM and label them company specific terms. The importance of that term to its company can be estimated by its probability. Examples of these terms may be departments, promotions, products, or specific fees and policy terminology.

While described herein with respect word lattice model, word embedding may also be used for determining the a priori appearance probability for correlating terms with similar appearance probabilities.

In accordance with principles described herein, term that are highly probably to appear at the domain level are considered more important terms. If they do not appear in other domains, they are considered domain-specific. If a term occurs in multiple subdomains, then the term may be considered generic to the domain, otherwise the term may be considered subdomain-specific.

After processing of texts according to principles described above, domain and sub-domain glossaries may be updated to include terms that are domain specific, sub-domain specific, important or not important, etc. Continued, further or periodic, etc. processing can allow the glossaries to be updated as necessary to make the LM usage more efficient, thus causing an improved functioning of the computer system performing the language processing, including accuracy of response and improved response time.

Principles described herein improve, for example, customer interaction with an interactive voice response (IVR) system or automated chat system. For example, a customer may use the term "baggage" or "luggage," which have the same meaning across multiple travel industries. This term in domain-level specific. But if the customer is calling about a frequent traveler account, for example, each conveyance company, e.g. an airline, may have its own branded terminology related to that company's frequent traveler program. For example, Delta Airlines uses "SkyMiles" while United Airlines uses "Mileage Plus," but these terms are equivalent in each of the two subdomains (Delta Airlines and United Airlines). Thus, "SkyMiles" and "Mileage Plus" are subdomain-specific terms. Such subdomain-specific terms will be embedded in the same context (i.e. surrounded by similar words with similar probabilities), regardless of the airline. Using the glossary building techniques as described above allows customers in each subdomain to have similar experiences. Also, the need to produce entire glossaries for individual subdomains is reduced, in that a general glossary can be produced for domain, supplemented by a subdomain-specific glossary for each subdomain.

Figure 2:
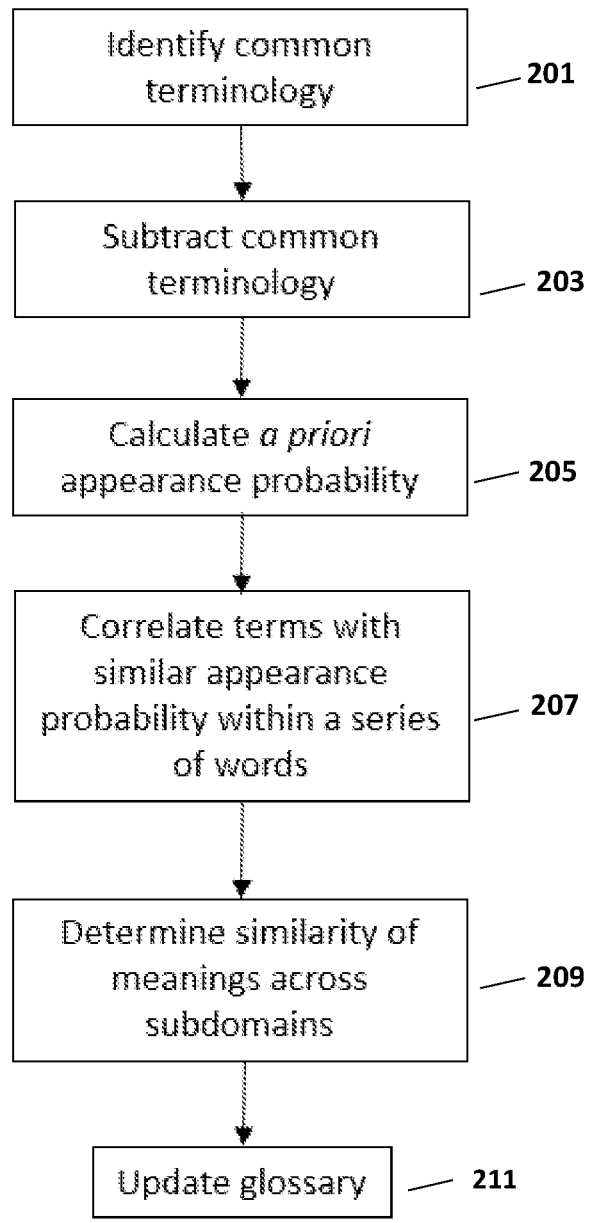
FIG. 2 is a flowchart showing an example set of steps for performing a method as described herein.

Referring to FIG. 2, a method according to principles described herein for automatically extracting subdomain specific terminology and phrases within a language model for a language domain, includes identifying terminology that is the same for all subdomains in the domain to define a common terminology, 201; subtracting the common terminology from the language model to identify subdomain specific terminology for each subdomain 203; calculating a priori appearance probability of a series of words using the subdomain terminology for each subdomain 205; and automatically determining similarity of meanings of terms across subdomains 209 by identifying terms with the similar appearance probability within a series of words 207. The glossary may then be updated accordingly 211.

In the method, terms with a high appearance probability may be deemed important to a subdomain. Also, the method may also include determining that subdomain-specific terminology having the same appearance probability and appearing in the same context have equivalent meaning. The method may also include comparing the appearance probability for each series of words to determine terms important to each subdomain. In the method the calculating a priori appearance probably may be calculated using a word lattice and/or using word embedding. The subdomain may be a specific business within an industry and the domain is the industry. The subdomain may be business units common in an industry and the domain is the industry. The method may also include extracting subdomain-specific technology. The method may also include populating subdomain-specific glossaries with the subdomain-specific terminology.

According to principles described herein, a computer product may include computer executable code embodied in a non-transitory computer readable medium that, when executing on one or more computing devices performs a method of automatically extracting subdomain specific terminology and phrases within a language model for a language domain. The method performed by execution of the computer executable code includes identifying terminology that is the same for all subdomains in the domain to define a common terminology; subtracting the common terminology from the language model to identify subdomain-specific terminology for each subdomain; calculating a priori appearance probability of a series of words using the subdomain terminology for each subdomain; and automatically determining similarity of meanings of terms across subdomains by identifying terms with the similar appearance probability within a series of words.

In the method performed by execution of the computer executable code, terms with a high appearance probability may be deemed important to a subdomain. Also, the method performed by execution of the computer executable code may also include determining that subdomain-specific terminology having the same appearance probability and appearing in the same context have equivalent meaning. The method performed by execution of the computer executable code may also include comparing the appearance probability for each series of words to determine terms important to each subdomain. In the method the calculating a priori appearance probably may be calculated using a word lattice and/or using word embedding. The subdomain may be a specific business within an industry and the domain is the industry. The subdomain may be business units common in an industry and the domain is the industry. The method performed by execution of the computer executable code may also include extracting subdomain-specific technology. The method performed by execution of the computer executable code may also include populating subdomain-specific glossaries with the subdomain-specific terminology.

While described herein with respect to domains and subdomains, further division may exist within subdomains that have division-specific terms and the methods described herein may further be applied to provide further division-specific glossaries. For example, the banking industry may be a domain; The subdomains may include credit cards and accounts. The divisions may be specific banks, such as Bank Of America, SunTrust, Wells Fargo, etc., which will have their own bank-specific terminology.

Throughout this application, various publications may have been referenced. The disclosures of these publications in their entireties are hereby incorporated by reference into this application in order to more fully describe the state of the art to which this invention pertains:

[1] Ronald Rosenfeld. The cmu statistical language modeling toolkit and its use in the 1994 arpa csr evaluation. In *Proceedings of the Spoken Language Systems Technology Workshop*, pages 47{50, 1995.

[2] Andreas Stolcke. Srilm-an extensible language modeling toolkit. In *Seventh international conference on spoken language processing,* 2002.

[3] Marcello Federico, Nicola Bertoldi, and Mauro Cettolo. Irstlm: an open source toolkit for handling large scale language models. In *Ninth Annual Conference of the International Speech Communication Association,* 2008.

[4] Juan Ramos. Using tf-idf to determine word relevance in document queries. In *Proceedings of the first instructional conference on machine learning,* 2003.

[5] Tomas Mikolov, Kai Chen, Greg Corrado, and Jeffrey Dean. Efficient estimation of word representations in vector space. arXiv preprint arXiv:1301.3781, 2013.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments, but should be defined only in accordance with the following claims and their equivalents.

What is claimed is:

1. A computer product comprising computer executable code embodied in a non-transitory computer readable medium that, when executing on one or more computing devices performs a method of automatically extracting subdomain specific terminology and phrases within a language model for a language domain, comprising:
identifying terminology that is the same for all subdomains in the domain to define a common terminology;
subtracting the common terminology from the language model to identify subdomain-specific terminology for each subdomain;
calculating a priori appearance probability of a series of words using the subdomain terminology for each subdomain; and
automatically determining similarity of meanings of terms across subdomains by identifying terms with the similar appearance probability within a series of words.

2. The computer program product of claim 1, wherein terms with a high appearance probability are deemed specific to a subdomain.

3. The computer product of claim 1, the method further comprising determining that subdomain-specific terminology having the same appearance probability and appearing in the same context have equivalent meaning.

4. The computer program product of claim 1, the method further comprising comparing the appearance probability for each series of words to determine terms important to each subdomain.

5. The computer program product of claim 1, wherein the calculating a priori appearance probably is calculated using a word lattice.

6. The computer program product of claim 1, wherein the calculating a priori appearance probability is calculated using word embedding.

7. The computer program product of claim 1, wherein the subdomain is a specific business within an industry and the domain is the industry.

8. The computer program product of claim 1, wherein the subdomain is business units common in an industry and the domain is the industry.

9. The computer program product of claim 1, the method further comprising extracting subdomain-specific technology.

10. The computer program product of claim 1, the method further comprising populating subdomain-specific glossaries with the subdomain-specific terminology.

11. A method of automatically extracting subdomain specific terminology and phrases within a language model for a language domain, comprising:
identifying terminology that is the same for all subdomains in the domain to define a common terminology;
subtracting the common terminology from the language model to identify subdomain specific terminology for each subdomain;
calculating a priori appearance probability of a series of words using the subdomain terminology for each subdomain; and
automatically determining similarity of meanings of terms across subdomains by identifying terms with the similar appearance probability within a series of words.

12. The method of claim 11, wherein terms with a high appearance probability are deemed important to a subdomain.

13. The method of claim 11, further comprising determining that subdomain-specific terminology having the same appearance probability and appearing in the same context have equivalent meaning.

14. The method of claim 11, comparing the appearance probability for each series of words to determine terms important to each subdomain.

15. The method of claim 11, wherein the calculating a priori appearance probably is calculated using a word lattice.

16. The method of claim 11, wherein the calculating a priori appearance probability is calculated using word embedding.

17. The method of claim 11, wherein the subdomain is a specific business within an industry and the domain is the industry.

18. The method of claim 11, wherein the subdomain is business units common in an industry and the domain is the industry.

19. The method of claim 11, further comprising extracting subdomain-specific technology.

20. The method of claim 11, further comprising populating subdomain-specific glossaries with the subdomain-specific terminology.

* * * * *